June 7, 1932.  L. R. LENTZ  1,861,805
FILTER
Filed Feb. 1, 1930
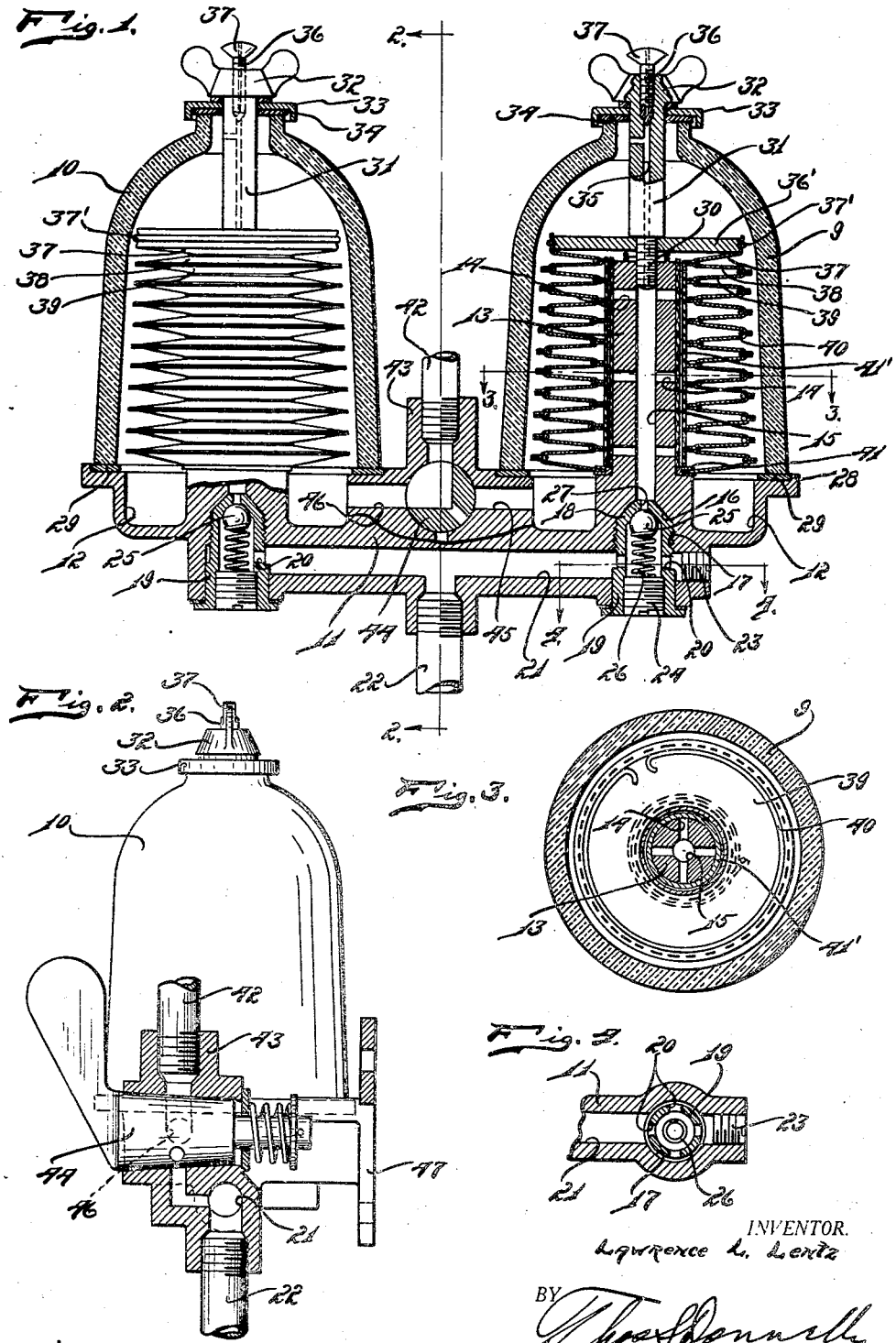
INVENTOR.
Lawrence L. Lentz
BY
ATTORNEY Patented June 7, 1932

1,861,805

UNITED STATES PATENT OFFICE

LAWRENCE R. LENTZ, OF WINDSOR, ONTARIO, CANADA

FILTER

Application filed February 1, 1930. Serial No. 425,127.

My invention relates to a new and useful improvement in a filter adapted primarily for filtering, by using suitable filtering material, both vapor and liquids of every kind, which is delivered to internal combustion engines and which passes through the filter, and also for filtering liquids used for mechanical refrigeration and for filtering oil, water, or air. It is an object of the present invention to provide a filter of this class which will be simple in structure, economical of manufacture, and highly efficient in use.

Another object of the invention is the provision of a filtering element having a maximum area exposed for filtering purposes and yet so constructed and arranged that it may be easily removed and replaced.

Another object of the invention is the provision in a filter of this class of a base having a sediment cavity to serve as a receptacle for foreign material which may be deposited therein.

Another object of the invention is the provision of check valves to control the flow of fuel from the filtering element.

Another object of the invention is the provision of an air relief in the filtering element which will permit the functioning of the filtering element throughout its entire length.

Other objects will appear hereinafter.

The invention consists in the combination and arrangement of parts hereinafter described and claimed.

The invention will be best understood by a reference to the accompanying drawing which forms a part of this specification and in which, Fig. 1 is a central vertical sectional view of the invention.

Fig. 2 is a view taken on line 2—2 of Fig. 1.

Fig. 3 is a view taken on line 3—3 of Fig. 1.

Fig. 4 is a fragmentary sectional view taken on line 4—4 of Fig. 1.

The invention comprises bell shaped covers or containers 9 and 10 which are positioned in inverted relation on a metallic base 11, the members 9 and 10 being preferably made from transparent material such as glass and the like. I prefer to use the filtering element in pairs, although the number of units used may be varied. The construction of each unit is identical so that a description of one will suffice for both. Formed in the base 11 below the cover or container 9 is a sediment receiving recess 12 and extending upwardly from the base, centrally of the recess 12 is a tubular post 13 having radially extending openings or passages formed therein communicating with the central passage or bore 15. This bore 15 opens into the enlarged recess 17 having its upper end tapered as at 16, engaging against which is the tapered end 18 of the sleeve 19 which is threaded into the base 11. Openings 20 are formed in the sleeve 19 so as to communicate the interior thereof with the horizontal passage 21 formed in the base and which communicates with the outlet delivery pipe 22. A plug 23 is threaded into the base 11 to close the passage 21 at its open end. A plug 24 is threaded into the sleeve 19 and engaging against this plug 24 is one end of a coil spring 26 the other end of which engages the ball valve 25 which serves to normally retain the opening 27 formed in the end of the sleeve 19 closed. On the base 11 is a flange 28 which serves as a retainer for retaining in position the gasket 29 against which engages the edge of the bell shaped member 9.

Threaded into the upper end of the post 13 is the reduced portion 30 of the stem 31 which is provided on its upper end with the head 32 which serves as a means for rotating the stem 31. The stem 31 projects through the cap 33 which engages the washer 34 and serves as a closure for the opening which is formed in the upper end of the bell shaped receptacle 9. A central passage 35 is formed through the stem 31 and the reduced portion 30 so as to communicate with the portion 15. A threaded stem 36 provided with the head 37 is threaded into the upper end of the post 31 and serves to close the passage 35. In use, when it is desired to permit the escape of air from the receptacle 9 the stem 36 may be unthreaded a sufficient distance so that it thus becomes possible to maintain the member 9 filled with liquid fuel. The stem 36 may also permit the necessary air reliefs to assure a constant flow of liquid from the receptacle 9.

The reduced portion 30 projects through a disc 36' to which is secured the outer edge of a filter section 37. The filtering element is formed from a number of these sections. Each of the sections comprises a circular disc formed from suitable filtering material such as chamois or buckskin. Each of these discs is provided with a central opening and the disc 38 is stitched at its inner edge to the disc 37 which is secured by the wire 37' to the retaining disc 36'. The filtering section 38 is stitched at its outer edge to the outer edge of the adjacent section 39, which in turn is stitched at its inner edge of the adjacent section and so on. A wire loop 40 engages between adjacent sections at the outer edges and serves to retain the filter element in distended form so that a bellows like structure is provided. The lower section of the filter element engages in the channel shaped rim 41 upon which is mounted the removable sleeve 41' positioned in embracing relation on the post 13.

A delivery pipe 42 is threaded into the nipple 43 which projects upwardly from the base 11 and serves to conduct the liquid fuel into the passage 46 or the passage 45 dependent upon the position of the stopcock 44. In use the fuel will pass into the passage 45 or 46 and thence through the filtering sleeve 41' into the bore 15 through the openings 14 and thence through the openings 20 and 27 into the passage 21 to the outlet delivery pipe 22.

It is believed apparent that upon removal of the stem 31 the receptacle 9 may be lifted out of position thus affording access to the filtering element so that it may be removed and replaced. The use of the check valve 25 prevents the flow of the fuel to the filtering element, not in use, when the engine is running, this being very necessary in fire department, air compressor, and aviation engines.

A flange 47 is mounted on the base 11 to afford means for mounting the filtering device in any position.

While I have illustrated and described the preferred form of construction I do not wish to limit myself to the precise details of structure shown but desire to avail myself of such variations and modifications as may come within the scope of the appended claim.

Having thus described my invention what I claim as new and desire to secure by Letters Patent is:

A filter of the class described, comprising: a base; tubular posts projecting upwardly from said base and having a central opening in communication with an outlet passage formed in said base; a filtering element positioned about said post and in communication with the interior thereof; an inverted bell shaped container embracing said filtering element; a cap for the upper end of said container for serving as a closure therefor; a stem projected through said cap and provided with a central longitudinally extending bore communicating with said central opening and by a lateral passage with the interior of said container; and a threaded member threaded in the outer end of said stem and serving as a closure for the outer end of said bore.

In testimony whereof I have signed the foregoing specification:

LAWRENCE R. LENTZ.